United States Patent
Broden et al.

(10) Patent No.: US 6,935,156 B2
(45) Date of Patent: Aug. 30, 2005

(54) CHARACTERIZATION OF PROCESS PRESSURE SENSOR

(75) Inventors: David Andrew Broden, Andover, MN (US); Timothy Patrick Fogarty, Minnetonka, MN (US); David Eugene Wiklund, Eden Prairie, MN (US); Terry Xen Beachey, Longmont, CO (US); Mark S. Schumacher, Minneapolis, MN (US)

(73) Assignee: Rosemount Inc., Eden Prairie, MN (US)

( * ) Notice: Subject to any disclaimer, the term of this patent is extended or adjusted under 35 U.S.C. 154(b) by 141 days.

(21) Appl. No.: 10/675,214

(22) Filed: Sep. 30, 2003

(65) Prior Publication Data

US 2005/0066703 A1 Mar. 31, 2005

(51) Int. Cl.[7] ................... G01P 21/00; G01L 27/00; G01L 11/00; G01C 19/00; G01C 25/00
(52) U.S. Cl. ................... 73/1.57; 73/1.59; 73/1.35; 702/138; 702/104
(58) Field of Search ................... 73/1.35, 1.57, 73/1.71, 1.59; 702/45, 47, 98, 100, 104, 138

(56) References Cited

U.S. PATENT DOCUMENTS

| | | | |
|---|---|---|---|
| 4,494,183 A | 1/1985 | Bayer et al. ................... 700/34 |
| 4,598,381 A | 7/1986 | Cucci ................... 702/138 |
| 5,329,818 A | 7/1994 | Frick et al. ................... 73/708 |
| 5,495,769 A | 3/1996 | Broden et al. ................... 73/718 |
| 5,606,513 A | 2/1997 | Louwagie et al. ........... 702/138 |
| 5,623,101 A | 4/1997 | Freitag ................... 73/708 |
| 5,642,301 A | 6/1997 | Warrior et al. ............... 702/104 |
| 5,817,950 A | 10/1998 | Wiklund et al. ......... 73/861.66 |
| 5,899,962 A | 5/1999 | Louwagie et al. ........... 702/138 |
| 5,960,375 A | 9/1999 | Warrior et al. ............... 702/104 |
| 6,032,109 A | 2/2000 | Ritmiller, III ............... 702/104 |
| 6,047,244 A | 4/2000 | Rud, Jr. ................... 702/98 |
| 6,182,019 B1 | 1/2001 | Wiklund ................... 702/100 |
| 6,257,050 B1 | 7/2001 | Nagano et al. ................. 73/47 |
| 6,295,875 B1 | 10/2001 | Frick et al. ................... 73/718 |
| 6,412,353 B1 | 7/2002 | Kleven et al. ............ 73/861.22 |
| 6,450,005 B1 | 9/2002 | Bentley ................... 73/1.59 |
| 6,484,590 B1 | 11/2002 | Kleven et al. ............ 73/861.22 |
| 6,654,697 B1 * | 11/2003 | Eryurek et al. ............... 702/47 |

FOREIGN PATENT DOCUMENTS

| | | |
|---|---|---|
| DE | 33 18 977 A | 11/1984 |
| EP | 0813047 | 12/1997 |
| GB | 898160 | 6/1962 |
| GB | 2 197 957 A | 6/1988 |

OTHER PUBLICATIONS

Notification of Transmittal of the International Search Report or the Declaration of PCT/US2004/031679.

* cited by examiner

Primary Examiner—Hezron Williams
Assistant Examiner—Tamiko Bellamy
(74) Attorney, Agent, or Firm—Westman, Champlin & Kelly, P.A.

(57) ABSTRACT

A pressure sensor of a process device, is characterized by applying a plurality of pressures to the process sensor. Outputs of the plurality of pressures are received. A compensation relationship is determined based upon the pressure sensor output. The characterization data is collected in a distribution which is non-uniform across the pressure range.

18 Claims, 3 Drawing Sheets

US 6,935,156 B2

CHARACTERIZATION OF PROCESS PRESSURE SENSOR

BACKGROUND OF THE INVENTION

The present invention relates to process variable sensor of the type used to sense a process variable of an industrial process. More specifically, the present invention relates to characterization of pressure sensors used in process monitor and control applications.

Process transmitters are used to monitor and control industrial processes by measuring various characteristics of fluids used in the process. (As used herein, fluid includes both liquid and gas phase materials and mixtures of such materials). One process variable which is frequently measured is pressure. The pressure can be a differential pressure or a line, gage, absolute or static pressure. In some installations, the measured pressure is used directly. In other configurations, the measured pressure is used to derive other process variables. For example, the differential pressure across a restriction (primary element) in a pipe is related to fluid flow rate through the pipe. Similarly, the differential pressure between two vertical locations in a tank is related to level of liquid in the tank. Process transmitters are used to measure such process variables and transmit the measured process variable to a remote location, for example a control room. A transmission can occur over various communication mediums, for example, a two-wire process control loop.

The pressure sensors used in process transmitters provide output signals related to applied pressure. The relationship between the output signal and the applied pressure is known to vary between pressure sensors and in some applications static pressure as well. The variations are functions of the applied pressure as well as the temperature of the pressure sensor. The variations may also be functions of the static pressure. In order to improve the accuracy of measurements using such pressure sensors, each pressure sensor typically undergoes a characterization process during manufacture. The characterization process involves applying known pressures to the pressure sensor and measuring the output of the pressure sensor. This is done with multiple processors. Typically, data is also taken at different temperatures. For example, a pressure sensor might be characterized between a pressure of 0 and 250 inches. Such a characterization process might take data at 10 evenly spaced pressure intervals (25 inches, 50, inches, 75 inches, etc.). Multiple data sets can be taken at different temperatures. The data is then fit to a polynomial curve, for example using a least squares curve fitting technique. The coefficients of the polynomial are then stored in a memory of the transmitter and used to compensate subsequent pressure measurements taken by the pressure sensor.

SUMMARY

A method of characterizing a pressure sensor of a process device is provided. A plurality of pressures are applied to the pressure sensor. Outputs of the pressure sensor or process device at the plurality of pressures are received. A compensation relationship is determined based upon the pressure sensor outputs. The outputs used to determine the compensation relationship are not evenly spaced through the pressure range applied to the pressure sensor.

DETAILED DESCRIPTION

Figure 1:
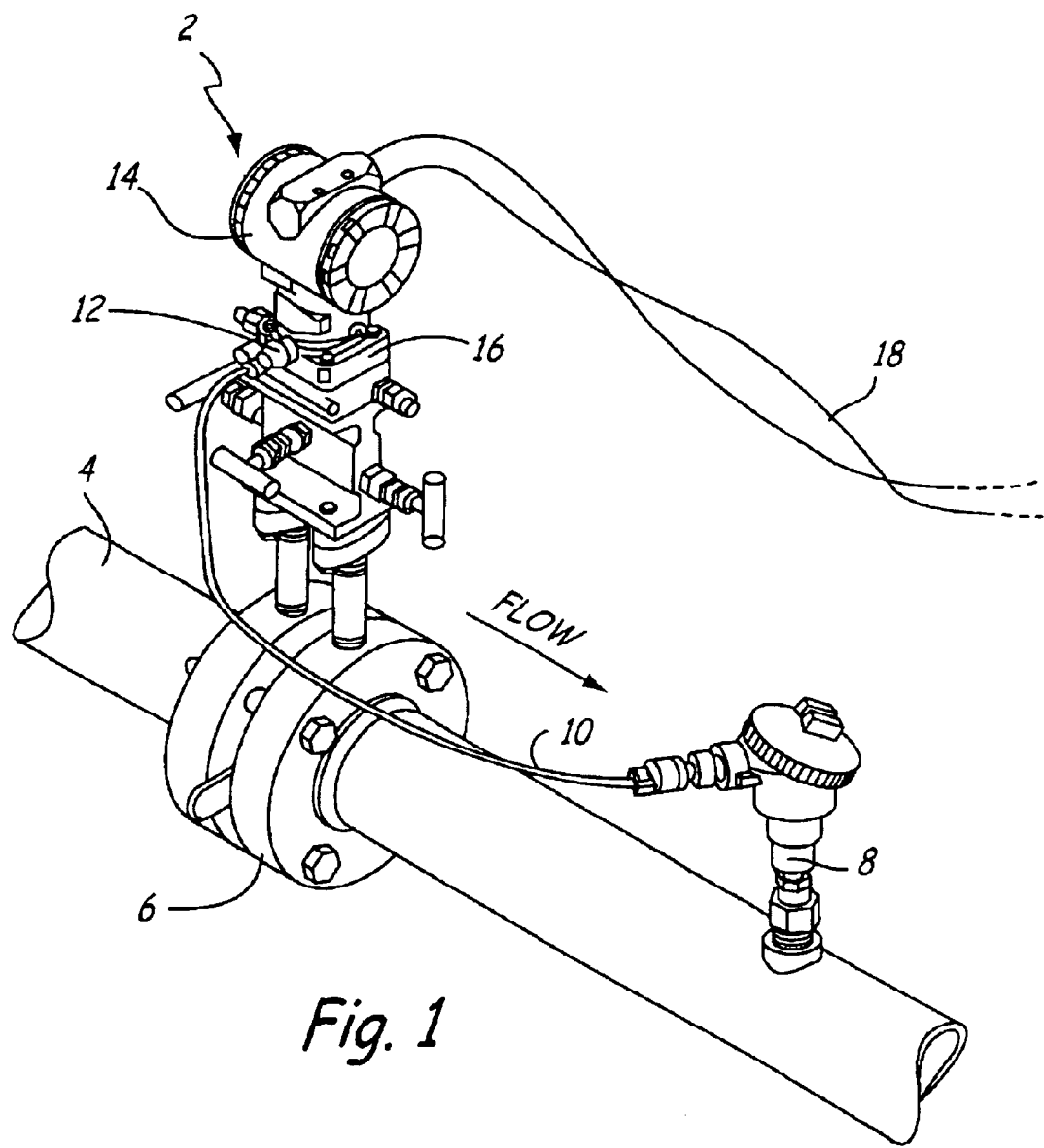
FIG. 1 is a perspective view of a flow transmitter in a process control or monitoring system.

FIG. 1 shows a transmitter 2 mechanically coupled to a pipe 4 through a pipe flange 6. A flow of liquid such as natural gas flows through pipe 4. In this embodiment, transmitter 2 receives differential pressure, absolute pressure and temperature, and provides an output related to mass flow.

In operation, temperature sensor 8 senses a process temperature downstream from the flow transmitter 2. The analog sensed temperature is transmitted over a cable 10 and enters transmitter 2 through an explosion proof boss 12 on the transmitter body. Transmitter 2 senses differential pressure and receives an analog process temperature input. The transmitter body preferably includes an electronics housing 14 connected to a sensor module housing 16. Transmitter 2 is connected to pipe 4 via a standard three or five valve manifold.

Figure 2:
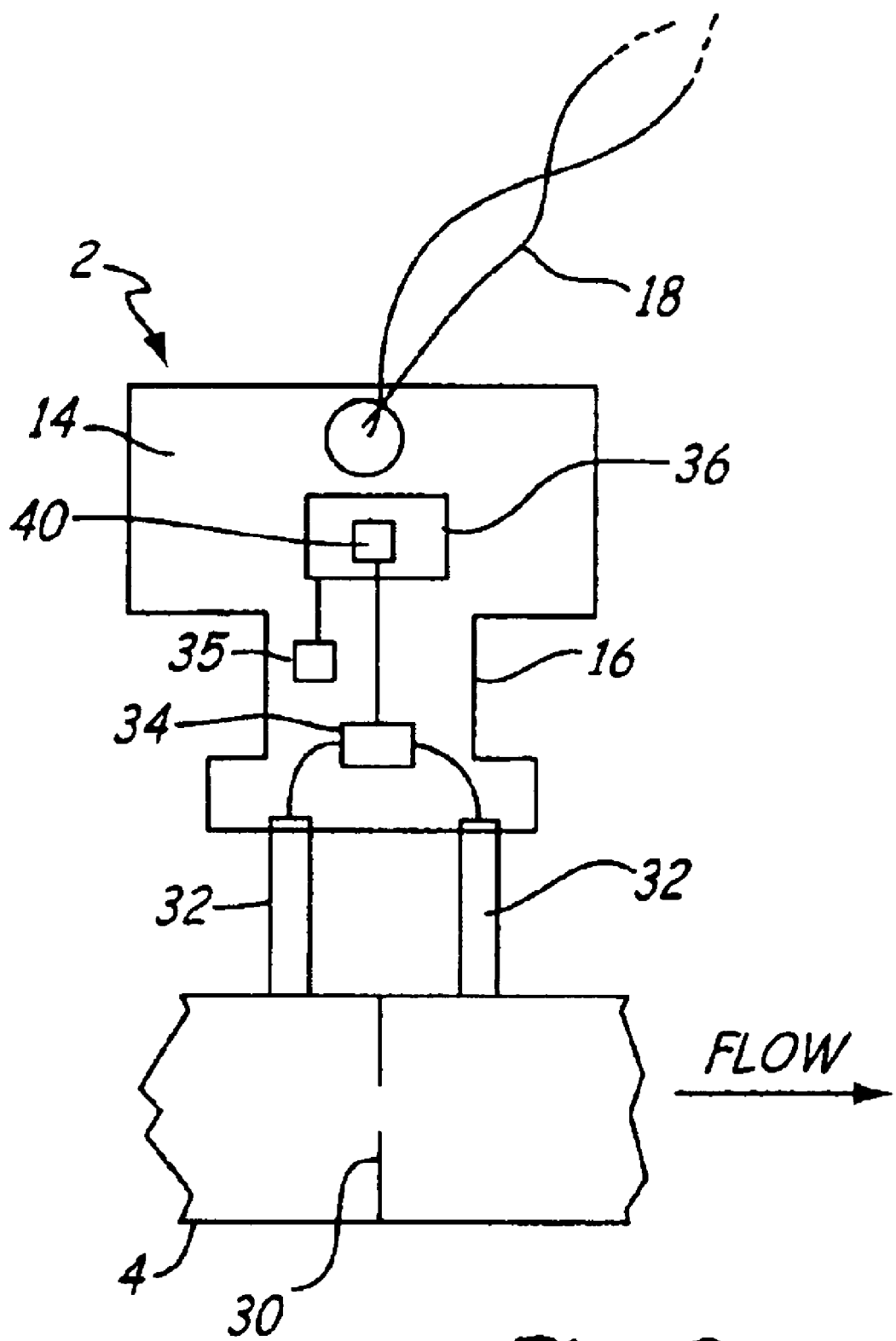
FIG. 2 is a simplified cross-sectional diagram showing the flow transmitter of FIG. 1.

FIG. 2 is a cross-sectional schematic view of transmitter 2 shown in FIG. 1. In FIG. 2, a restriction referred to as a primary element 30 is shown in pipe 4. Process couplings 32 are coupled on either side of restriction 30 and are used to provide a differential process pressure to pressure inputs of transmitter 2. For example, isolation diaphragms (not shown) can be used to isolate an internal fill fluid carried in transmitter 2 from the process fluid carried in connections 32. A differential pressure sensor 34 receives the process pressure and provides an input signal to electronic circuitry 36. Additionally, a temperature sensor 35 provides an input to electronic circuitry 36 which is related to the temperature of pressure sensor 34. The temperature sensor can be at any location but preferably provides an accurate indication of the temperature of pressure sensor 34. Typically, the temperature sensor 35 is used in addition to the temperature sensor 8 shown in FIG. 1. In accordance with the present invention, electronic circuitry 36 compensates for errors in the pressure measurement using a compensation formula. The compensation formula can comprise a polynomial in which coefficients of the polynomial are stored in a memory 40 in transmitter 2. The polynomial is a function of sensed pressure and measured temperature. The calculated pressure can then be transmitted directly on process control loop 18 or can be used to derive other process variables such as process flow. The polynomial computation, and other computations are performed by digital circuitry, for example microprocessor, in electronic circuitry 36.

Although FIGS. 1 and 2 illustrate a transmitter configured to measure flow rate based upon a differential pressure, in some embodiments, the present invention is applicable to any type of transmitter or process device which measures a pressure including a level transmitter or a pressure transmitter, and can be applied to sensors which measure differential or static pressures.

Typically, prior art pressure sensors used in process transmitters undergo a commissioning (or "characterization") process during manufacture. This commissioning process is referred to as C/V (Characterized and Verify). During C/V, the pressure sensor is exposed to various pressures across the expected pressure range of the sensor. The measurements are taken at a number of fixed pressures which are evenly (uniformly) distributed through the pressure range. For each applied pressure, the output of the pressure sensor or pressure measurement circuitry is stored. The characterization process is typically performed at a number of different temperatures. Using the stored outputs from the pressure sensor at each of the data points obtained for each applied pressure and temperature, a curve fitting technique is used to generate coefficients of a polynomial. A typical polynomial includes five coefficients related to pressure and four coefficients related to temperature. The coefficients are stored in a memory of the transmitter and are used to correct pressure sensor readings during operation of the transmitter.

The present invention includes the recognition that in some applications it is desirable to increase the accuracy of the pressure sensor measurements through a particular pressure subrange which is less than the entire characterization pressure range. For example, in differential pressure based flowmeters, the differential pressure created across the restriction is relatively small and difficult to accurately measure at low flow rates. This can lead to inaccuracies in flow measurements made by transmitters which utilize differential pressure when the flow rate is relatively small. In such a configuration, the present invention increases the accuracy of the pressure sensor measurements when the pressure is relatively low.

The present invention improves the accuracy of the characterization polynomial by taking more data points, or data points which are more closely spaced, through a particular subrange of the characterization range. This provides increased accuracy of the characterization polynomial through the selected subrange. The present invention utilizes non-uniform spacing of pressure compensation points over the operating range of the pressure sensor in order to provide additional compensation calculation data points through a desired subrange of the operating range. The distribution of the characterization data points is, in general, non-uniform and can be selected as desired. For example, the distribution can be in accordance with a step change, a ramp or sloping change, or more complex functions such as logarithmic or exponential changes. The present invention includes a transmitter or other process device which includes polynomial coefficients generated using such a technique, as well as a method and apparatus for characterizing a pressure sensor in accordance with this technique.

Figure 3:
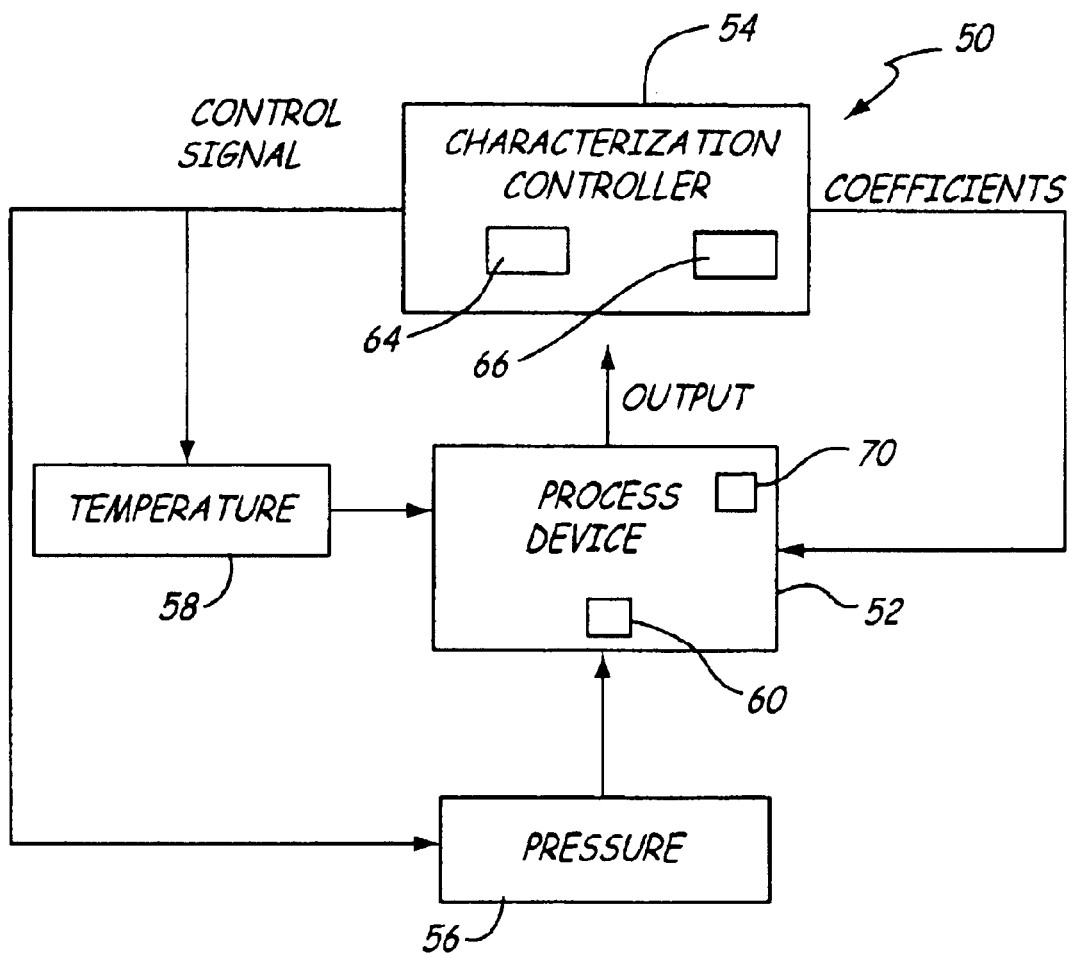
FIG. 3 is a diagram illustrating a device for characterizing a pressure sensor of a process device in accordance with the invention.

FIG. 3 is a simplified block diagram of a characterization device 50 for use in characterizing a pressure sensor 60 of a process device 52. Characterization device 50 includes a characterization controller 54 which couples to a pressure source 56 and a temperature source 58. Pressure source 56 is configured to apply a selected pressure to pressure sensor 60 of process device 52 in response to a control signal from characterization controller 54. Temperature source 58 is also controlled by characterization controller 54 and is configured to control the temperature of process device 52 as desired. Additional temperature and pressure sensors (not shown) can be used to provide feedback to characterization controller 54. In response to the applied pressure, process device 52 provides an output to characterization controller 54. The output is related to the output from the pressure sensor and can be taken directly from the pressure sensor or can be an output generated by subsequent electrical circuitry of process device 52.

Typically, characterization controller 54 includes a digital controller such as a microprocessor 64 which operates in accordance with instructions stored in a memory 66. During the characterization process, characterization controller sets the temperature of process device 52 to a desired temperature using temperature source 52. A first desired pressure is applied to the pressure sensor 60 of process device 52 using pressure source 56. The output from process device 52 is stored in the memory 66 of characterization controller 54. Next, a second desired pressure is applied to pressure sensor 60 using pressure source 56 and another data point is stored in memory 56. The process is repeated at the desired applied pressures across the desired pressure range of the pressure sensor 60. Once all of the data points for a particular pressure range have been obtained, the temperature of the process device 52 is changed to another desired temperature using temperature source 58 and the process is repeated. The characterization controller 54 generates coefficients for a polynomial based upon the collected data stored in memory 56. The coefficients of the polynomial are generated based upon the actual pressure between the actual applied pressure and the output from the process device along with the temperature of the process device. The coefficients are stored in a memory 70 of process device 52. During subsequent operation, the process device 52 retrieves the stored coefficients and applies the characterization polynomial to output of pressure sensor 60 to correct errors in the sensed pressure.

In accordance with the present invention, characterization controller 54 causes a plurality of pressures to be applied to pressure sensor 60 by pressure source 56. Data is taken at each applied pressure. The applied pressures are not evenly distributed across the range of pressures which are applied. For example, for a pressure sensor being characterized over a range of 0 to 250 inches, data can be taken at applied pressures of 0, 5, 10, 15, 20, 25, 50, 100 and 250 inches. Data is typically collected at more than one temperature for each of the applied pressures. The particular distribution of applied pressures can be selected as desired. For example, a step function can be used, exponential, logarithmic or other distribution can be selected which is not uniform across the entire pressure range. In other words, within at least one sub-pressure range which is a subset of the entire pressure range used for characterization, the distribution of applied pressure points is different than in other portions of the characterization pressure range.

The collected data is used to generate coefficients for a polynomial which characterize the pressure sensor 60 of process device 52. In one specific example, a polynomial of the fifth order of pressure and a fourth order of temperature is used to correct the pressure sensor measurement. In such an embodiment, the corrected pressure is calculated as follows:

$$P_{corrected} = a_0 + a_1 T + a_2 T^2 + a_3 T^3 + a_4 T^4 + b_0 P + \\ b_1 PT + b_2 PT^2 + b_3 PT^3 + b_4 PT^4 + c_0 P^2 + c_1 P^2 T + \\ c_2 P^2 T^2 + c_3 P^2 T^3 + c_4 P^2 T^4 + d_0 P^3 + d_1 P^3 T + d_2 P^3 T^3 + \\ d_3 P^3 T^3 + d_4 P^3 T^4 + e_0 P^4 + e_1 P^4 T + e_2 P^4 T^4 + e_3 P^4 T^3 + \\ e_4 P^4 T^4 + f_0 P^5 + f_1 P^5 T + f_2 P^5 T^5 + f_3 P^5 T^3 + f_4 P^5 T^4$$

EQ. 1

Where $a_0, a_1, \ldots f_4$ are the stored coefficients of the polynomial, P is the sensed pressure prior to correction and T is the temperature of the pressure sensor. In accordance with the invention, the coefficients $a_0 \ldots f_4$ are generated using curve fitting techniques in which the data is collected in a non-uniform manner across the characterization pressure range. In one aspect, the distribution is non-linear.

In another embodiment, the process device is characterized over a range of static pressures in addition to a range of differential pressures. The distribution of data points for static pressure is also non-uniform across the pressure range. For example, a multivariable process device can be characterized in static pressure as well as differential pressure and temperature.

Process device 52 can be any process device which utilizes pressure. Examples include any type of pressure transmitter configured for sensing static, gage, absolute or differential pressure. Other transmitters include transmitters which determine flow rate based upon a differential pressure or transmitters which measure liquid level in a container based upon differential pressure. The distribution of the data points across the pressure range can be selected for the desired implementation of the process device. As discussed above, for flow transmitters, additional data points in the low pressure range of the pressure sensor is desirable. On the other hand, for a level application, the pressure range which corresponds to a substantially full container may be of particular importance and additional data points can be collected in this pressure range. In one embodiment, the same number of data points are collected across the entire pressure range as in prior art techniques. However, the distribution of data points is weighted to the particular subrange desired. In another example, additional data collection points can be used in comparison in prior art techniques. The distribution of data points used for temperature characterization can also be non-uniformly spaced across the temperature range.

Although the present invention has been described with reference to preferred embodiments, workers skilled in the art will recognize that changes may be made in form and detail without departing from the spirit and scope of the invention.

What is claimed is:

1. A method of characterizing a pressure sensor of a process device, comprising:

applying a plurality of pressures to a pressure sensor of the process device across a characterization pressure range; and receiving outputs from the pressure sensor related to the applied pressure;

determining a compensation relationship based upon the outputs from the pressure sensor;

wherein different applied pressures are non-uniformly distributed across the characterization pressure range.

2. The method of claim 1 wherein the process device comprises a flow transmitter.

3. The method of claim 1 wherein the process device comprises a level transmitter.

4. The method of claim 1 wherein the compensation relationship comprises a polynomial.

5. The method of claim 1 including comparing outputs of the pressure sensor at the plurality of differential pressures with reference values.

6. The method of claim 1 wherein the distribution of applied pressures is a linear function.

7. The method of claim 1 wherein the distribution of applied pressures is an exponential function.

8. The method of claim 1 wherein the distribution of applied pressures is a logarithmic function.

9. The method of claim 1 wherein the step of applying includes applying pressures at closer intervals over a lower pressure range than over a higher pressure range.

10. The method of claim 1 wherein the step of applying a plurality of pressures is performed at more than one temperature.

11. The method of claim 1 wherein the step of applying a plurality of pressures comprises moving a fluid past a primary element to create a differential pressure.

12. The method of claim 1 including storing compensation values in a memory of the process device which are related to the compensation relationship.

13. The method of claim 1 wherein the compensation values comprise polynomial coefficients.

14. The method of claim 1 wherein the pressure sensor comprises a differential pressure sensor.

15. The method of claim 1 wherein the characterization is for differential pressure and static pressure.

16. The method of claim 1 wherein the characterization is for static pressure and temperature.

17. A calibration apparatus configured to couple to the process device and implement the method of claim 1.

18. A process device including compensation values stored in a memory which are determined in accordance with the method of claim 1.

* * * * *